US006279968B1

(12) United States Patent
Stoll et al.

(10) Patent No.: US 6,279,968 B1
(45) Date of Patent: Aug. 28, 2001

(54) SERVICING APPARATUS FOR TREATING COMPRESSED AIR

(75) Inventors: Kurt Stoll, Esslingen; Michael Berner, Kirchheim, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/091,643

(22) PCT Filed: Oct. 1, 1997

(86) PCT No.: PCT/EP97/05415

§ 371 Date: Jun. 16, 1998

§ 102(e) Date: Jun. 16, 1998

(87) PCT Pub. No.: WO98/21488

PCT Pub. Date: May 22, 1998

(30) Foreign Application Priority Data

Nov. 14, 1996 (DE) .......................................... 196 47 073

(51) Int. Cl.[7] .............................................. F16L 17/00

(52) U.S. Cl. ......................... 285/361; 285/360; 285/376; 285/912; 285/18

(58) Field of Search ............................ 285/18, 39, 360, 285/361, 376, 401, 402, 912, 362, 377

(56) References Cited

U.S. PATENT DOCUMENTS 941,990 * 11/1909 Hickey ............................ 285/361 X
977,472 * 12/1910 Pilkington ........................... 285/912
981,866 * 1/1911 Lockart ............................ 285/361 X
1,236,182 * 8/1917 Kennard ................................ 285/912
1,580,541 * 4/1926 Sherman .......................... 285/360 X
2,347,721 * 5/1944 Tjaarda et al. ....................... 285/912
2,652,828 * 9/1953 Matheson ......................... 285/360 X
4,652,021 * 3/1987 Pido ................................ 285/912 X
4,990,022 * 2/1991 Watanabe et al. ............... 285/912 X
5,058,929 * 10/1991 Zentner ........................... 285/912 X
5,372,464 12/1994 Bureller .

FOREIGN PATENT DOCUMENTS 75 14 529 3/1978 (DE) .
35 23 406 A1 1/1987 (DE) .
44 42 128 A1 5/1996 (DE) .
0 708 007 A1 4/1996 (EP) .
904 * of 1874 (GB) .................................... 285/912

* cited by examiner

*Primary Examiner*—Teri Pham Luu
(74) *Attorney, Agent, or Firm*—Hoffmann & Baron, LLP

(57) ABSTRACT

A servicing device for compressed air handling is proposed, which possesses a principal body (2) and a receiving shell (4) releaseably attached thereto by means of a bayonet connecting device (12). The rotary movement necessary for producing the bayonet connection of the receiving shell (4) is produced using a rotary drive means (33), which is arranged on a holding body (34), on which the receiving shell (4) is mounted in a rotary fashion. It is in this manner that simple mounting and removal of the receiving shell is rendered possible even when there is little space.

33 Claims, 4 Drawing Sheets

SERVICING APPARATUS FOR TREATING COMPRESSED AIR

BACKGROUND OF THE INVENTION

1. Field of the Invention

The invention relates to a servicing device for compressed air handling systems comprising a principal body able to be incorporated in a fluid duct system and a receiving shell able to be releaseably attached to the principal body by a bayonet connecting device, first bayonet connecting means being provided on said receiving shell, which by rotation in relation to the principal body may be moved between a released position rendering possible mounting and dismounting of the receiving shell along an assembly axis and a locking position latching the receiving shell on the principal body.

2. Description of the Prior Art

Servicing devices of this type are employed in order to prepare or, respectively, treat compressed air as employed in pneumatic equipment. Accordingly various types of servicing devices, as for example filter devices, oiler devices, regulating devices or combinations of such devices exist. To the extent that it is here a question of a serving device having a filter or oiler there is as a rule a principal body able to be placed on a fluid duct of the compressed air network, a receiving shell being arranged underneath the said body and called referred to as a filter shell or oiler shell. This receiving shell serves to take up or catch condensate or oil.

Under certain circumstances it is necessary for the receiving shell to be removed from the principal body. Accordingly a releasable connecting device is provided between the receiving shell and the principal body, such connecting device preferably being in the form of a bayonet connection. Such a bayonet connection is for example disclosed in the German patent publication 4,442,128 A1, in which a servicing device of the type initially mentioned is described in detail.

In order to latch the receiving shell on the principal body, it is moved toward the principal body along an imaginary assembly axis onto the principal body and then twisted in relation to same. When this is done first outwardly projecting bayonet connecting means provided on the receiving shell assume a locking position, in which same hook onto second bayonet connecting means provided on the principal body. For the removal of the receiving shell same is twisted in the opposite direction until it reaches a release position so that it may readily be removed.

Frequently several servicing devices of different types are directly mounted on one another to form servicing devices.

This means that the accessibility of the receiving shells is interfered with and the handling thereof for attachment to or removal from the principal body is more difficult.

SUMMARY OF THE INVENTION

One object of the present invention is to provide a servicing device of the type initially mentioned whose receiving shell may be simply mounted and dismounted even when there is little space available.

In order to attain this object there is a provision such that the receiving shell is held on a holding body adapted to be mounted in a rotationally locked manner on the principal body, the first bayonet connecting means being able to be rotated in relation to the holding body and a manually actuatable rotary drive means is provided on the holding body serving to produce the rotary movement of the first bayonet connecting means.

It is in this manner that the first bayonet connecting means provided on the receiving shell may be cause to perform the necessary rotary movement without having to take hold of the receiving shell itself for turning. The operation of twisting or turning is caused by actuation of the rotary drive means, which is arranged at a suitable position on the holding body and is connected with the bayonet connecting means of the receiving shell in a rotary driving manner. In this respect it is possible for the rotary drive means to be positioned where it may be readily gripped, for instance on the front side of the servicing device so that laterally adjacent to the servicing device further servicing devices may be arranged in the direct vicinity without interfering with the rotary actuation. It is in this manner that it is possible for extremely compact arrangements of servicing devices to be assembled without interfering with the mounting on and removal from a principal body.

Further advantageous developments of the invention are defined in the dependent claims.

It is convenient for the rotary drive means to possess drive tooth means able to be moved, and more particularly turned, in relation to the holding body, such drive tooth means being engaged with a output drive tooth means associated with the receiving shell and the first bayonet connecting means. On actuation of the rotary drive means there is then a movement of the drive tooth means associated with it so that the output drive tooth means, in mesh with same, of the receiving shell is also displaced and a rotary movement of the first bayonet connecting means, connected with it, is caused. The result is then a slip-free and extremely reliable transmission of force.

Both the drive tooth means of the rotary drive means and also the output drive tooth means associated with the receiving shell preferably possess an arcuate form and are designed in the form of interlocking external tooth means.

The drive movement of the drive tooth means is preferably a rotary movement, the center of the rotary movement preferably coinciding with the center of curvature of the arcuate form.

The necessary actuating force may be produced in an extremely simple manner with little application of force, if the drive tooth means is adapted to cooperate with a pivotally placed actuating lever so that there is a leverage for acting on the output drive tooth means.

In order to prevent accidental actuation of the rotary drive means it is convenient to provide a safety catch for releaseably securing the actuating lever in its home position in which the first bayonet connecting means assume its locked setting.

It would be feasible in principle for the first bayonet connecting means to be arranged on a for instance annular body and to mount same on the receiving shell for rotary motion in relation to it. However there is a substantial reduction in complexity without causing any special sealing problems, if the first bayonet connecting means, as in the prior art, is a permanent and more especially integral part of the receiving shell, the rotary motion of the first bayonet connection means being due to a rotary movement, caused by the rotary drive means, of the receiving shell itself. The output drive tooth means is in this case preferably permanently connected with the receiving shell and more particularly designed in the form of an integral component thereof. The holding body may in this case constitute a bearing body, on which the receiving shell is held in a rotary fashion while being unable to move axially.

In a particularly convenient design the holding body is designed in the form of an external housing, which entirely surrounds the receiving shell apart from the region with the first bayonet connecting means.

In what follows the invention will be described in detail with reference to the accompanying drawings.

DETAILED DESCRIPTION OF THE INVENTION

Figure 1:
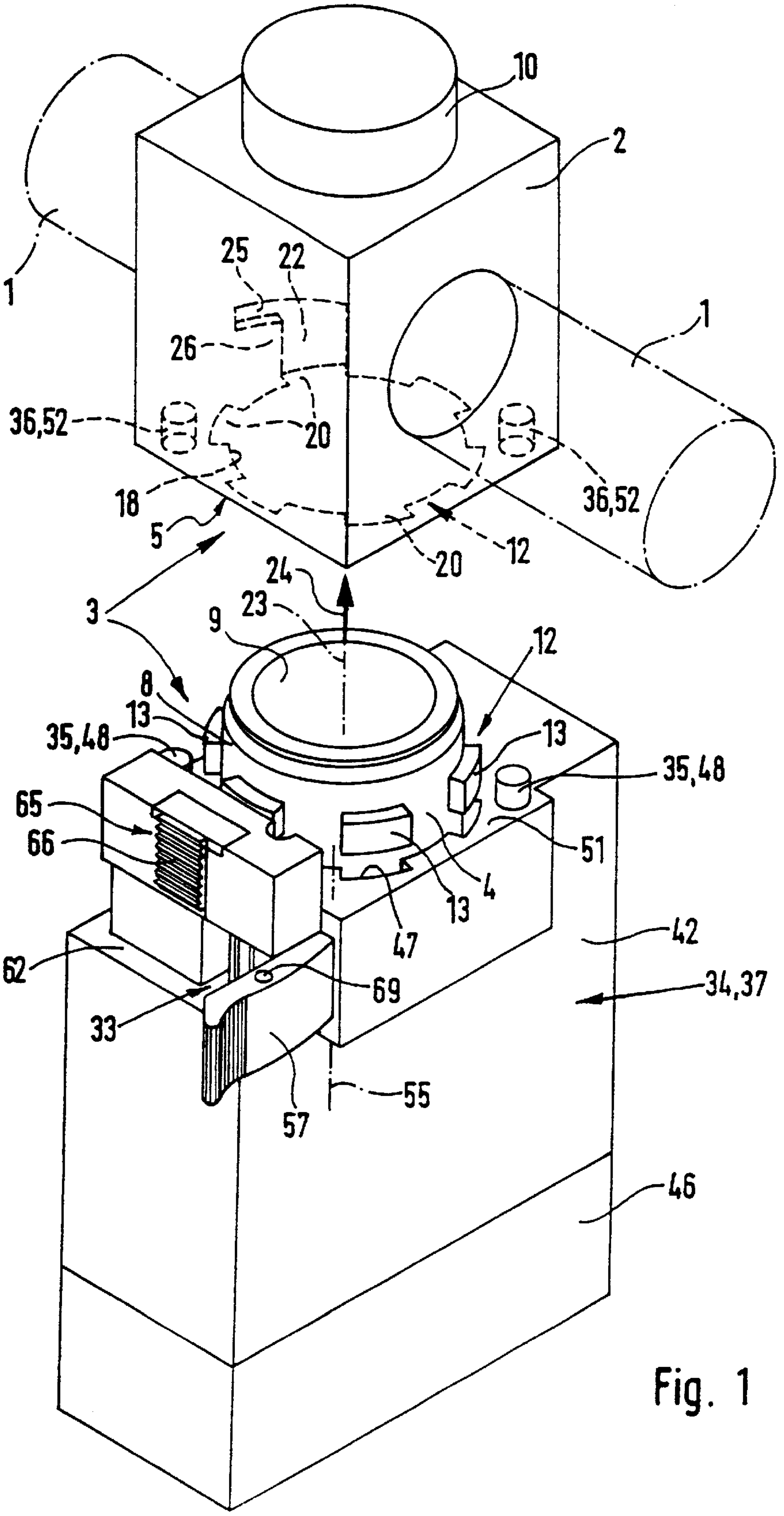
FIG. 1 shows a first embodiment of the servicing device of the invention with the receiving shell removed from the principal body and directly prior to its attachment on the principal body.
Figure 3:
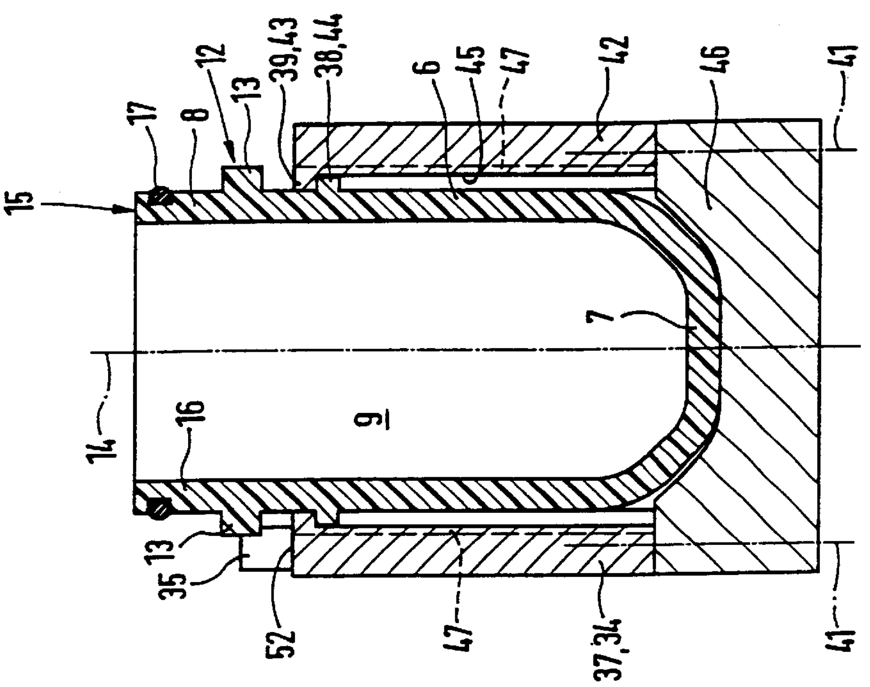
FIG. 3 is a diagrammatic longitudinal section taken through the receiving shell and the associated holding body on the section line III—III in FIG. 2, the rotary drive means being omitted in order to make the drawing more straightforward.

FIG. 1 shows in chained lines a fluid duct system 1 consisting of compressed air ducts, such system leading from a pressure medium source, not illustrated in detail, to one or more loads, not illustrated in detail. On such fluid duct system 1 the principal body 2, only indicated diagrammatically in FIG. 1, of a so-called servicing device 3 is placed. The servicing device 3 serves to treat or prepare compressed air flowing in the fluid duct system 1, it being for example a combined unit made up of a filter and a regulator, wherein compressed air is filtered and has its pressure set to a secondary pressure lower than the primary pressure. Such pressure regulation is performed by a regulating unit arranged in the interior of the principal body 2 and not illustrated in detail, the setting knob 10 of such unit being visible on the top side of the principal body 2 (not illustrated in FIG. 2).

There are further types of servicing devices 3, whose principal body 2 possess other functional units instead of a regulating unit.

The servicing device 3 in the present embodiment comprises a filter, not illustrated in detail, which is arranged on the principal body 2 and extends downward. Here it is enclosed by a receiving shell 4, which is for example releaseably secured on a downwardly facing assembly side 5 of the principal body 2.

The receiving shell 4 is constituted by a vessel-like cup body. It possesses a preferably tubular side wall 6, which is adjoined at the lower side by a floor wall 7 which is preferably in the form of a segment of a sphere. On the end side, axially opposite to the floor wall 7, of the side wall 6 the receiving shell 4 is open so that its interior 9 is accessible. Its section here is termed the attachment end 8, since it may be releaseably attached with same to the fore on the assembly side 5 of the principal body 2.

Figure 3A:
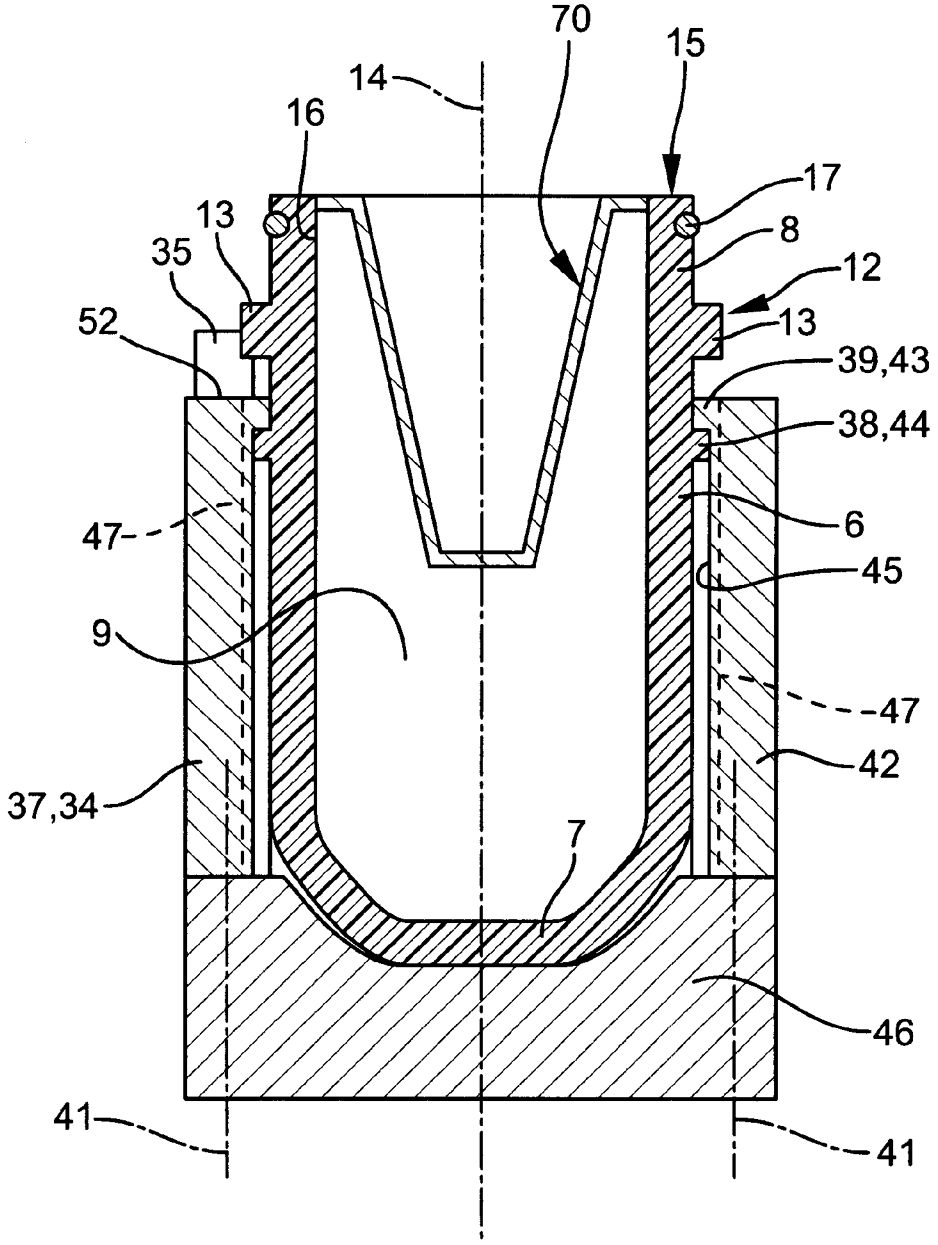
FIG. 3A is a diagrammatic longitudinal section of the receiving shell of FIG. 3 including a filter.

The receiving shell 4 of the present embodiment may be termed a filter shell. In its interior 9 condensate is deposited from the compressed air flowing therethrough, which from time to time or continuously may be removed through a condense drain means, not illustrated in detail. At any rate the receiving shell 4 is designed so as to be gas- and condensate-tight. As shown in FIG. 3A, a filter 70 may be used in conjunction with the receiving shell 4.

The attachment of the receiving shell 4 on the principal body 2 is performed using a bayonet connecting device 12. The receiving shell 4 is fixed releaseably to the principal body by an insertion and twisting movement.

The bayonet connecting device 12 possesses, in the present embodiment, a plurality of first bayonet connecting means 13 which are arranged in the vicinity of the attachment end 8 on the outer face of the side wall 6 of the receiving shell 4. In the embodiment they are constituted by individual radial projections, which are distributed about the periphery around the longitudinal axis 14 and are more particularly made integrally with the receiving shell 4.

Axially between the ring of first bayonet connecting means 13 and the terminal edge 15 of the attachment end 8 there extends a positioning guide 16 as part of the side wall 6, which at its outer face preferably has a surrounding groove, in which a sealing ring 17 is held.

In its interior the principal body 2 possesses a well 18 open toward the assembly side 5 and having a substantially cylindrical configuration. The geometry is so selected that the attachment end 4 of the receiving shell 4 may be inserted coaxially. Distributed about the inner periphery of the well 18 there is a plurality of essentially axially extending longitudinal grooves 22 open toward the assembly side 5, of which grooves FIG. 1 only shows one, while only the openings 20 of the remaining ones are indicated on the assembly side 5. The cross section and distribution of the longitudinal grooves 22 are adapted to the first bayonet connecting means 13, which may be inserted into the longitudinal grooves 22, when the receiving shell 4 is inserted along an assembly axis 23, coinciding with its longitudinal axis 14, so that its attachment end 8 is moved into the well as indicated by the arrow 24.

At the inner end, axially opposite to the assembly side 5, of each respective longitudinal groove 22 there is a peripheral groove 25 extending some distance in the peripheral direction of the well 18, such groove 25 at the same time having axially a slightly rising form and extending into the interior of the well 18. A region, between the peripheral groove 25 and the assembly side 5, of the principal body 2 constitutes a second bayonet connecting means 26 so that in all the number of the second bayonet connecting means 26 equal to the number of first bayonet connecting means 13 is present on the principal body 2. In FIG. 1 only one of these second bayonet connecting means 26 is illustrated, the other ones being the same in design.

The first bayonet connecting means 13 are preferably attached permanently to the receiving shell 4. They are more especially an integral component of the receiving shell 4 which is for example manufactured of glass material or of plastic material.

Figure 2:
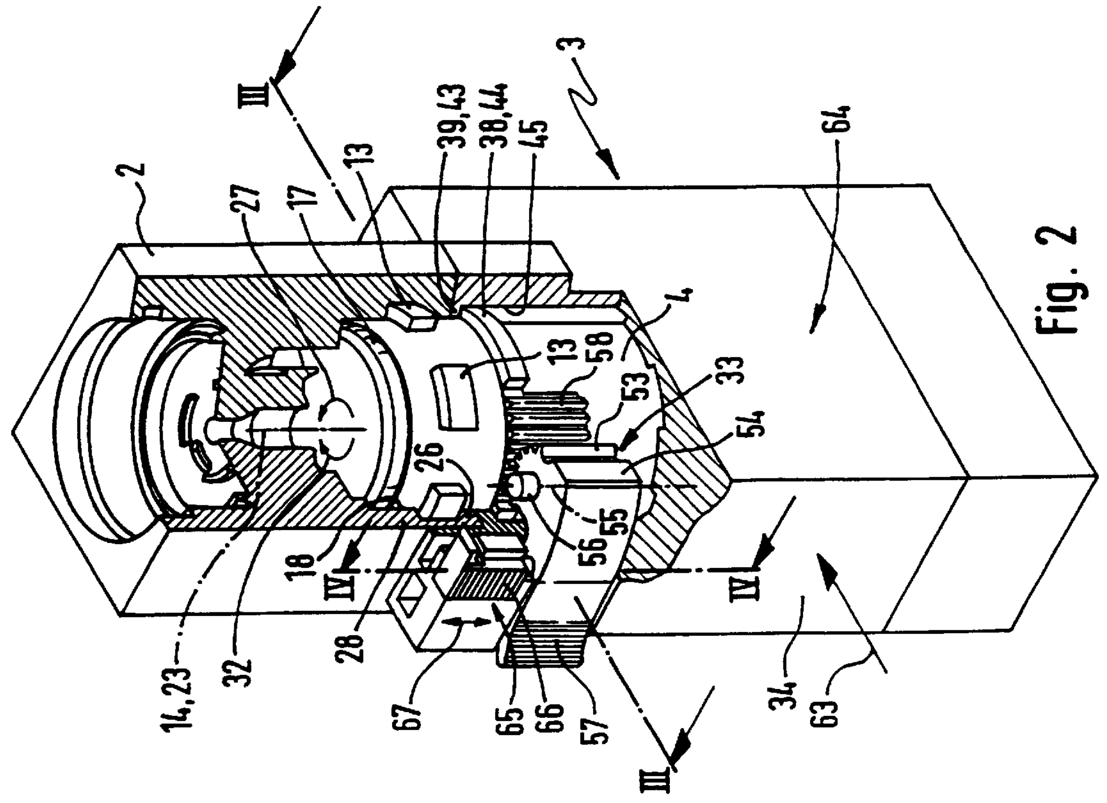
FIG. 2 shows the arrangement of FIG. 1 with the receiving shell arranged on the principal body.

The mounting of the receiving shell 4 by insertion on the principal body 2 and furthermore the oppositely directed removal from the principal body 2 is performed in accordance with the position illustrated in FIG. 1, of the first bayonet connecting means 13, which here assume a release position in alignment with the longitudinal axis of the longitudinal grooves 22. In order to lock the receiving shell 4 on the principal body 2 it is, after its first bayonet connecting means 13 have been inserted as far as the inner end in the longitudinal grooves 22, turned about its longitudinal axis 14 as indicated by the arrow 27 so that the first bayonet connecting means 13 extend into the peripheral grooves 25 and radially hook onto the second bayonet connecting means 26. The first bayonet connecting means 13 then assume a locking position as depicted in FIG. 2, in the case of which cooperating with the second bayonet connecting means 26 they prevent the receiving shell 4 from being pulled out of the well 18.

Simultaneously the receiving shell 4 is clamped by the cooperation of the first and second bayonet connecting means 26 on the principal body 2. This best takes place by cooperation of the positioning guide 16 with an associated terminal section 28 of the well 18. Moreover the transition between the receiving shell 4 and the principal body 2 is sealed in a fluid-tight fashion because the sealing ring 17 is thrust against the inner face of the terminal section 28 of the well 18, which may be made slightly conical.

In order to be able to remove the receiving shell 4 from the principal body 2 it is turned back in a release direction opposite to the above mentioned locking direction 27 so far that its first bayonet connecting means 13 assume their released position in the longitudinal grooves 22, following which the receiving shell 4 may be withdrawn from the well 18 in the longitudinal direction of the imaginary assembly axis 23.

It is an advantage in the case of the servicing device 3 described herein that the rotary movement, required for locking and release, of the receiving shell 4 does not have to be produced by direct manual contact with the receiving shell 4. Thus even in cases where there is very little space available it is still possible for assembly and dismounting of the receiving shell 4 to be readily performed. This advantage is achieved by a manually operable rotary drive means 33, which is arranged on a holding body 34 and has a rotary drive connection with the receiving shell and which for its part is also held on the holding body 34 and in this respect is mounted for rotary movement in relation to the holding body 23 about its longitudinal axis 14. Furthermore mutually complementary anti-twist means 35 and 36 are present on the holding body 34 and the principal body 2, such anti-twist means coming into locking engagement with each other, when the receiving shell 4 together with the associated holding body 34 is arranged on the principal body 2 in the direction 24 of insertion. The twist-locked attachment of the holding body 34 so produced in relation to the principal body 2 ensures a reliable relative rotary movement between the receiving shell 4 and the holding body 34 on operation of the rotary drive means 33.

In the working embodiment the holding body 34 is constituted by an external housing 37, which completely accommodates the receiving shell 4 with the exception of the attachment end 8 having the first bayonet connecting means 13 and preferably has a wall without any openings. In this external housing 37 the receiving shell 4 is so movingly mounted that it is able to be turned in accordance with the desired direction 27 and 32 in relation to the external housing 37 about its longitudinal axis 14, while being simultaneously locked so that it cannot move in the longitudinal direction 14. Owing to an abutment means 38 provided in the embodiment on the outer periphery of the side wall 6 of the receiving shell 4 and owing to a counter-abutment means 39, provided on the holding body 34, for cooperation therewith it is at least possible to ensure that the receiving shell 4 cannot be pulled out from the holding body 34 in the insertion direction 24.

In the illustrated working embodiment the holding body 34 possesses a sleeve-like or annular holding section 42, which coaxially externally surrounds the receiving shell 4 for the part of the length thereof adjoining the attachment end 8. During assembly the receiving shell 4 with its attachment end to the fore is inserted from below through the holding section 42 until the attachment end 8 sticks upward out of the top. The insertion movement is limited by the above mentioned abutment means 38 and the counter-abutment means 39 cooperating with same. The counter-abutment means 39 is in the working embodiment constituted by radial projection 43 arranged on the top terminal region of the holding section 42 and projecting inwardly into the opening 45 in the holding section 42. As a matter of principle a plurality of such radial projections 43 could be arranged distributed about the periphery. In the working embodiment it is a question of a ring-like projection 43, which extends at least some distance in the peripheral direction of the opening 45. It has a radial projection 44 constituting the abutment means 38, arranged externally on the side wall 6 of the receiving shell 4 and axially internally rests against the radial projection 43 of the counter-abutment means 39. Here as well it is possible again for a plurality of radial projections to be provided distributed about the periphery or, as in the working embodiment, to have a radial projection similar to a ring which extends at least some distance in the peripheral direction of the receiving shell 4.

For axially latching the receiving shell 4 in relation to the holding body 34 in the working embodiment on the bottom side, facing away from the principal body 2, of the holding section 42 an attachment section 46 is arranged which is connected releaseably to the same by, for example, screws 41, such section 46 fitting around the floor wall of the receiving shell 4 and supporting same. This attachment section 46 is attached to the holding section 42, after the receiving shell 4 has been inserted. The arrangement is such that between the receiving shell 4 and the holding body 34 sufficient axial play remains in order to render possible rotation of the receiving shell 4 in relation to the holding body 34.

On the inner periphery of the opening 45 there is furthermore a number of longitudinally extending, axially continuous assembly grooves 47 equal to the number of first bayonet connecting means 13. The configuration of their cross section is adapted to that of the first bayonet connecting means 13, which therefore on insertion of the receiving shell 4 into the holding section 42 can slide along in the assembly grooves 47.

The above mentioned first anti-twist means 35 are constituted by pin-like projections 48, which are located on the top side 51, facing the principal body 2, of the holding body 34 and starting at the holding body 34 project axially toward the principal body 2. The anti-twist means 36 provided on the principal body are constituted by recesses or, respectively, wells 52, which open toward the assembly side 5 and are aligned with the projections 48. It will be clear that the arrangement could also be reversed. If the holding body 34 together with the receiving shell 4 is mounted on the principal body 2, the projections 48 will interlockingly fit into the recesses 52 so that the holding body 34 will be locked to the principal body 2 in such a manner as to prevent relative rotation.

At one point on the periphery of the holding section 42 the rotary drive means 33 is arranged. It comprises in the working embodiment a drive tooth means 53 having an arcuate configuration and which is designed in the form of external tooth means on a drive element 54. The axis 55 of rotation extends in parallelism to the assembly axis 23 outside the opening 45. In FIG. 2 one of two bearing pins 56 of the drive element will be seen, by means of which the drive element 54 is pivotally held in interlocking recesses in the holding body 34 generally at the same level as the abutment means 38.

The drive element 54 possesses furthermore an actuating lever 57, which extends athwart the axis 55 of rotation and extends away from the axis 55 of rotation. It may be readily gripped with one finger and manually pivoted about the axis 55 of rotation, something which causes a simultaneous pivot movement of the drive tooth means 53 about the said axis 55 of rotation. The center of curvature of the drive tooth means 53 preferably coincides with the axis 55 of rotation.

The drive tooth means 53 extends some distance into the opening 45 defined by the holding section 42. Here it is engaged with an outer drive tooth means 58 which is connected with the receiving shell 4 in such a manner as to prevent relative rotation. In the case of the output tooth means 58 of the working embodiment it is a question of an external tooth means, which is permanently mounted on the outer periphery of the side wall 6 of the receiving shell 4 and more especially is intergrally formed with it. Its curvature is opposite to that of the drive tooth means 54 so that the two tooth means 53 and 58 behave like gear wheels in mesh in the engagement region thereof. The center of curvature of the output drive tooth means 58 is preferably on the longitudinal axis 14. In this respect the corresponding radius of curvature is larger than that of the drive tooth means 53 so that there is a step-down gearing effect from the drive tooth means 53 to the output drive tooth means 58.

Since to shift the first bayonet connecting means 13 between their released position and their locked position only a small angular movement is required, it is possible for the peripheral extent of the output drive tooth means 38 to be limited to a part of the outer periphery of the receiving shell 4. In the working example the abutment means 38 constituted by an annular projection 44, of the receiving shell 4 is interrupted at one point on its periphery, the intermediate space so formed having the output drive tooth means 58 placed in it.

By pivoting of the actuating lever 57 it is now possible from the drive tooth means 53 to be pivoted about the axis 55 of rotation. This causes there to be an interlocking engagement with the output drive tooth means 58 so that same is turned jointly with the receiving shell 4 about the longitudinal axis 14. Simultaneously there is a corresponding rotation of the first bayonet connecting means 13 arranged on the receiving shell 4 the rotary movement thereof for releasing and locking the bayonet connecting device 12 may be therefore brought about manually by actuation of the rotary drive means 33.

One advantage is that the rotary drive means 33 can be arranged at a single point on the periphery of the receiving shell 4 on the holding body 34. For actuation it is therefore only necessary for a small region of the outer periphery of the servicing device 3 to be accessible. It is convenient if the rotary drive means 33 is placed, as illustrated, on the front side of the servicing device 3, that is to say on one of the sides, which is aligned at a right angle to the longitudinal run of the fluid duct system 1. This means that in case of need several servicing devices 3 may be collected together in a small space to form stacks of servicing devices, it also being possible for the holder bodies 34 as well to be placed directly adjacent to each other in order to provide a space saving arrangement. The rotary actuation of the receiving shell 4 is not interfered with as a consequence of the rotary drive means 33, which is always accessible on the front side.

Figure 4:
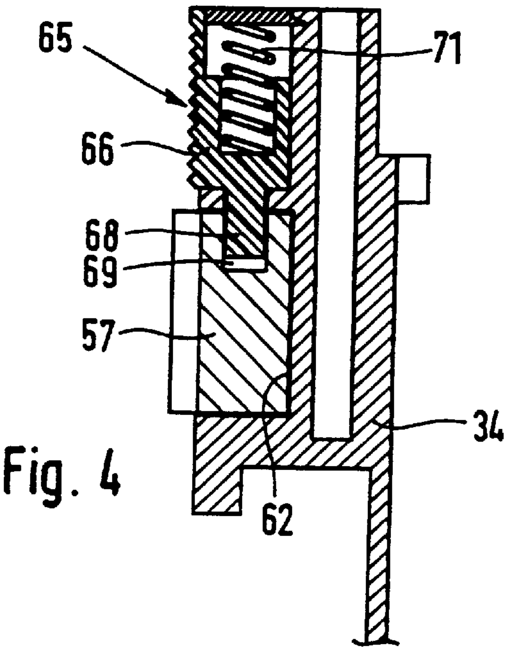
FIG. 4 is a longitudinal section taken through part of the servicing device on the section line IV—IV with the actuating lever of the rotary drive means and the securing means associated with same, the actuating lever being secured in its home position by a securing bolt located in its securing position.
Figure 5:
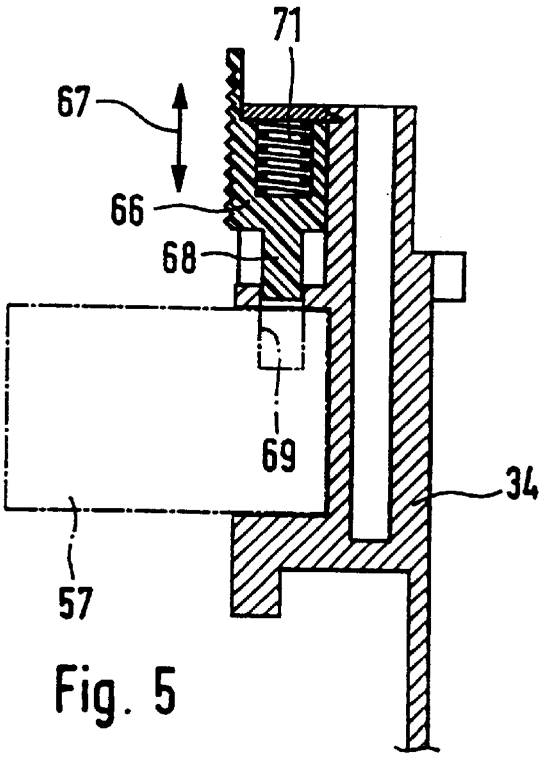
FIG. 5 shows the arrangement of FIG. 4 with the actuating lever, released and pivoted into its actuated position, of the rotary drive means.

It is an advantage that the drive element 54 of the rotary drive means 33 is so designed that the actuating lever 57 may be at least partly lowered in a home position illustrated in FIGS. 2 and 4 into a shallow recess 62 in the external surface of the holder body 34. In this home position the first bayonet connecting means 13 will assume the locking position. In order to turn the same into the release position, the actuating lever 57 is gripped at its free end projecting out from the shallow recess 62 in the working embodiment and pivoted out of the shallow recess 62 about the axis 55 of rotation until it assumes the actuated position depicted in FIGS. 1 and 5, wherein it projects forwardly out of the holder body 34.

In order to have the largest possible lever arm and accordingly advantageous actuating forces, the drive tooth means 53, as seen in the direction of the arrow 63, is placed eccentrically so that it is located, like the axis 55 of rotation as well, in the vicinity of one of the two side faces 64 turned in the direction in which the fluid duct system 1 extends, of the holding body 34. The actuating lever 57 then extends transversely over the front side of the holding body 34 toward the other side face so that generally the entire overall width of the holding body 34 is available for the overall length of the actuating lever 57.

It is convenient to provide a securing means 65 as illustrated for the rotary drive means 33, such securing means serving to prevent accidental operation of the rotary drive means 33.

The securing means 65 in the working example comprises a securing bolt 66 which is arranged on the holding body 34 for movement to and fro as indicated by the double arrow. The direction 67 of sliding conveniently extends in parallelism to the longitudinal axis 14. As will appear from FIGS. 4 and 5 in more detail, the securing bolt 66 is located in the working embodiment outside the plane of pivoting of the actuating lever 57 and thus underneath or, a and illustrated, above this actuating lever 57. It may be shifted between a securing position illustrated in FIG. 4 and a released position depicted in FIG. 5. In the securing position it cooperates with the actuating lever 57, when same is in the home position so that same is not able to be pivoted. Complementary securing means 68 and 69 are provided on the securing bolt 66 and on the actuating lever 57, which in the secured position interlock with one another. It is convenient for the securing bolt 66 to be biased by a spring means 71 into the securing position as indicated by FIG. 4.

In order to pivot the actuating lever out of the home position the securing lever 66 must be shifted against the force of the) spring means 71 at a right angle to the pivot plane of the actuating lever 57 until the securing means 68, formed in the working example by a projection, comes clear of engagement with the securing means 69 designed, for example, in the form of a recess in the actuating lever 57.

What is claimed is:

1. A compressed air system servicing device comprising:

a principal body in operative communication with a fluid duct system;

a holding body including a manually actuable rotary drive; and a receiving shell rotatably held on said holding body, said principal body, holding body and receiving shell defining an air service device for conditioning air in the fluid duct system, said receiving shell having a bayonet connecting device rotatable relative to the holding body, whereby the bayonet connecting device rotates upon actuation of said rotary drive in order to secure said holding body to said principal body.

2. The servicing device as claimed in claim 1, characterized in that the rotary drive includes at least one rotary drive tooth movable in relation to the holding body (34), said at least one rotary drive tooth engaging at least one output drive tooth connected to the receiving shell, whereby rotation of the at least one rotary drive tooth causes the relative rotation of the at least one output drive tooth and the resultant rotary movement of the bayonet connecting device.

3. The servicing device as claimed in claim 2, characterized in that the at least one rotary drive tooth (53) has an arcuate form and actuation of the rotary drive (33) causes the at least one rotary drive tooth to be shifted about an axis (55) of rotation.

4. The servicing device as claimed in claim 3, characterized in that the axis (55) of rotation of the at least one rotary drive tooth (53) extends through the center of curvature of the at least one rotary drive tooth arcuate form.

5. The servicing device as claimed in claim 3, characterized in that the axis (55) of rotation of the at least one rotary drive tooth (53) extends in parallelism to the assembly axis (23).

6. The servicing device as claimed in claim 2, characterized in that the rotary drive includes an actuating lever (57) which is connected with the at least one rotary drive tooth (53).

7. The servicing device as claimed in claim 6, characterized in that the actuating lever includes a securing means (65) arranged on the holding body (34), said securing means releasably securing the actuating lever (57) in a home position, said home position corresponding to the locking position of the bayonet connecting device.

8. The servicing device as claimed in claim 7, characterized in that the securing means (65) includes a moveable securing bolt (66), said bolt being spring loaded into a securing position, and cooperating with the actuating lever (57) in the home position.

9. The servicing device as claimed in claim 6, characterized in that the actuating lever (57) in its home position is at least partly received in a shallow recess (62) in the holding body (34).

10. The servicing device as claimed in claim 2, characterized in that the at least one output drive tooth (58) has an arcuate form extending in the peripheral direction in relation to the axis (23) of assembly.

11. The servicing device as claimed in claim 10, characterized in that the at least one output drive tooth (58) is located on the outer periphery of the receiving shell (4).

12. The servicing device as claimed in claim 2, characterized in that the at least one output drive tooth (58) is an integral component of the receiving shell (4).

13. The servicing device as claimed in claim 1, characterized in that the bayonet connecting device (13) is a permanent part of the receiving shell (4).

14. The servicing device as claimed in claim 1, characterized in that the receiving shell (4) (35) is rotatable about its longitudinal axis (14) and at the same time is axially held by the holding body.

15. The servicing device as claimed in claim 14, characterized in that the holding body (34) includes an annular holding section (42) surrounding the receiving shell, an inner periphery of the holding section (42) being substantially cylindrically shaped, the holding body having longitudinally extending assembly grooves (47), said grooves allowing passage of the bayonet connecting device (13).

16. The servicing device as claimed in claim 15, characterized by a counter-abutment means (39) on the holding section (42) limiting the insertion movement of the receiving shell (4) and cooperating with an abutment means (38) provided on the receiving shell (4).

17. The servicing device as claimed in claim 15, characterized in that the receiving shell (4) has an attachment end (8) projecting out from the top side of the holding body and the holding body has an attachment section provided on the lower side of the holding body, said attachment section releasably connected to the holding body and fitting underneath the receiving shell.

18. The servicing device as claimed in claim 1, characterized in that the holding body (34) is constituted by an external housing (37), said external housing completely surrounding the receiving shell (4) with the exception of the bayonet connecting device (13).

19. The servicing device as claimed in claim 1, characterized by mutually complementary anti-twist members (35 and 36) on the holding body (34) and on the principal body (2), said anti-twist members engaging with one another when the receiving shell is mounted on the principal body, and said anti-twist members being complementary shaped projections and recesses which releasably engage one another.

20. A compressed air system servicing device as defined in claim 1, wherein the holding body includes a vessel for holding a liquid.

21. A compressed air system servicing device as defined in claim 1, wherein said vessel includes a filter shell to receive condensation removed from a filter positioned in said vessel.

22. A compressed air system servicing device as defined in claim 1, wherein said rotary drive includes an actuating lever pivotally secured to said holding body.

23. A servicing device for conditioning air in a fluid duct system, comprising:

a principal body connectable to the fluid duct system, said principal body having a first bayonet connection;

a holding body;

a receiving shell rotatably supported by the holding body and moveable between a released position and a locked position, said principal body, holding body and receiving shell defining an air service device for conditioning air in the fluid duct system, said receiving shell having a second bayonet connection which is complementary in shape to the first bayonet connection, said first bayonet connection and said second bayonet connection cooperating together to allow the receiving shell to releasably engage the principal body; and a rotary drive attached to the holding body, said rotary drive rotating the receiving shell relative to the holding body between the released position and the locked position to selectively secure and release said holding body to said principal body without rotation of said holding body relative to said principal body.

24. The servicing device of claim 23, wherein the rotary drive includes an actuating lever, said actuating lever being moveable between an open position and a home position, said home position corresponding to the locked position of the receiving shell.

25. The servicing device of claim 24, wherein the holding body includes a securing member, said securing member cooperating with the actuating lever to secure the actuating lever in the home position.

26. The servicing device of claim 23, wherein the principal body is provided with a first anti-twist member, and the holding body is provided with a second anti-twist member, said first anti-twist member and said second anti-twist member being complementary shaped and engaging one another so as to prevent rotation of the holding body in relation to the principal body as the receiving shell is moved between the released position and the locked position.

27. A servicing device for conditioning air in a fluid duct system, comprising:

a principal body connectable to the fluid duct system, said principal body having a first bayonet connection;

a holding body;

a receiving shell rotatably supported by the holding body, said receiving shell being moveable between a released position and a locked position, said receiving shell having a second bayonet connection which is complementary in shape to the first bayonet connection, said first bayonet connection and said second bayonet connection cooperating together to allow the receiving shell to releasably engage the principal body;

a rotary drive attached to the holding body, said rotary drive rotating the receiving shell relative to the holding body between the released position and the locked position to selectively secure and release said holding body to said principal body without rotation of said holding body relative to said principal body; and a first anti-twist member positioned on the principal body, and the holding body is provided with a second anti-twist member, said first anti-twist member and said second anti-twist member being complementary shaped and engaging one another so as to prevent rotation of the holding body in relation to the principal body as the receiving shell is moved between the released position and the locked position.

28. A servicing device for conditioning air in a fluid duct system comprising:

a principal body connectable to the fluid duct system;

a receiving shell releasably attached to the principal body by a bayonet connecting device, said bayonet connecting device being provided on said receiving shell, whereby said receiving shell when rotated along an assembly axis in relation to said principal body has a released and locked position with said principal body;

a holding body, said receiving shell being rotatably held in said holding body and said holding body is mountable in a rotationally locked manner on the principal body, and said bayonet connecting device is rotatable in relation to the holding body; and a manually actuable rotary drive attached to said holding body including an actuating lever connected to at least one rotary drive tooth movable in relation to said holding body, at least one rotary drive tooth connected to the receiving shell, whereby rotation of the at least one rotary drive tooth causes the relative rotation of the at least one output drive tooth and the resultant rotary movement of the bayonet connecting section between a released position and a locked position, and the actuating lever having a securing means arranged on the holding body, said securing means releasably securing the actuating lever in a home position, said home position corresponding to the locking position of the bayonet connecting device.

29. A servicing device for conditioning air in a fluid duct system comprising:

a principal body connectable to the fluid duct system;

a receiving shell releasably attached to the principal body by a bayonet connecting device, said bayonet connecting device being provided on said receiving shell, whereby said receiving shell when rotated along an assembly axis in relation to said principal body has a released and locked position with said principal body;

a holding body, whereby said receiving shell is rotatably held in said holding body and said holding body is mountable in a rotationally locked manner on the principal body, and said bayonet connecting device is rotatable in relation to the holding body; and a manually actuable rotary drive attached to said holding body including an actuating lever connected to at least one rotary drive tooth movable in relation to said holding body, at least one rotary drive tooth connected to the receiving shell, whereby rotation of the at least one rotary drive tooth causes the relative rotation of the at least one output drive tooth and the resultant rotary movement of the bayonet connecting section between a released position and a locked position, and the actuating lever having a securing means arranged on the holding body, said securing means releasably securing the actuating lever in a home position, said home position corresponding to the locking position of the bayonet connecting device, said securing means having a moveable securing bolt, said bolt being spring loaded into a securing position, and cooperating with the actuating lever in the home position.

30. A servicing device for conditioning air in a fluid duct system comprising:

a principal body connectable to the fluid duct system;

a receiving shell releasably attached to the principal body by a bayonet connecting device, said bayonet connecting device being provided on said receiving shell, whereby said receiving shell when rotated along an assembly axis in relation to said principal body has a released and locked position with said principal body;

a holding body having an annular section surrounding the receiving shell, an inner periphery of the holding section being substantially cylindrically shaped and, the holding body having longitudinally extending assembly grooves, said grooves allowing passage of the bayonet connecting device, whereby said receiving shell is rotatably held in said holding body about its longitudinal axis, and said holding body is mountable in a rotationally locked manner on the principal body, and said bayonet connecting device is rotatable in relation to the holding body; and a manually actuable rotary drive attached to said holding body whereby rotation of the rotary drive causes rotation of the receiving shell and the bayonet connecting section between a released position and a locked position.

31. A servicing device for conditioning air in a fluid duct system comprising:

a principal body connectable to the fluid duct system;

a receiving shell having an attachment end projecting out from the top side of the holding body and the holding body has an attachment section provided on the lower side of the holding body, said attachment section releasably connected to the holding body and fitting underneath the receiving shell, and said receiving shell is releasably attached to the principal body by a bayonet connecting device, said bayonet connecting device being provided on said receiving shell, whereby said receiving shell when rotated along an assembly axis in relation to said principal body has a released and locked position with said principal body;

a holding body having an annular section surrounding the receiving shell, an inner periphery of the holding section being substantially cylindrically shaped and, the holding body having longitudinally extending assembly grooves, said grooves allowing passage of the bayonet connecting device, whereby said receiving shell is rotatably held in said holding body about its longitudinal axis, and said holding body is mountable in a rotationally locked manner on the principal body, and said bayonet connecting device is rotatable in relation to the holding body; and a manually actuable rotary drive attached to said holding body whereby rotation of the rotary drive causes rotation of the receiving shell and the bayonet connecting section between a released position and a locked position.

32. A servicing device for conditioning air in a fluid duct system comprising:

a principal body connectable to the fluid duct system;

a receiving shell releasably attached to the principal body by a bayonet connecting device, said bayonet connecting device being provided on said receiving shell, whereby said receiving shell when rotated along an assembly axis in relation to said principal body has a released and locked position with said principal body;

a holding body, and said holding body is mountable in a rotationally locked manner on the principal body, and said bayonet connecting device is rotatable in relation to the holding body;

a plurality of mutually complementary anti-twist members on the holding body and on the principal body, said anti-twist members engaging one another when the receiving shell is mounted on the principal body, and said anti-twist members being complementary shaped projections and recesses which releasably engage one another; and a manually actuable rotary drive attached to said holding body whereby rotation of the rotary drive causes rotation of the receiving shell and the bayonet connecting section between a released position and a locked position.

33. A servicing device for conditioning air in a fluid duct system, comprising:

a principal body connectable to the fluid duct system, said principal body having a first bayonet connection;

a holding body;

a receiving shell rotatably supported by the holding body, said receiving shell being moveable between a released position and a locked position, said receiving shell having a second bayonet connection which is complementary in shape to the first bayonet connection, said first bayonet connection and said second bayonet connection cooperating together to allow the receiving shell to releasably engage the principal body; and a rotary drive having an actuating lever, said actuating lever being moveable between an open position and a home position, said home position corresponding to the locked position of the receiving shell, said rotary drive attached to the holding body, said rotary drive rotating the receiving shell relative to the holding body between the released position and the locked position to selectively secure and release said holding body to said principal body without rotation of said holding body relative to said principal body.

* * * * *

UNITED STATES PATENT AND TRADEMARK OFFICE

CERTIFICATE OF CORRECTION

PATENT NO. : 6,279,968 B1
DATED : August 28, 2001
INVENTOR(S) : Stoll et al.

It is certified that error appears in the above-identified patent and that said Letters Patent is hereby corrected as shown below:

Column 7,
Line 24, now reads "drive tooth means 54" should read -- drive tooth means 53 --.

Line 36, now reads "output drive tooth means 38" should read -- output drive tooth means 58 --.

Column 9,
Line 58, now reads "shell (4) (35)" should read -- shell (4) --.

Signed and Sealed this

Seventh Day of May 2002

Attest:

JAMES E. ROGAN

*Attesting Officer*

*Director of the United States Patent and Trademark Office*